US012688175B2

(12) United States Patent
Wei

(10) Patent No.: US 12,688,175 B2
(45) Date of Patent: Jul. 21, 2026

(54) DATA REPLICATION AND RECURSIVE TREE STRUCTURE SEARCHING

(71) Applicant: Blue Origin Manufacturing, LLC, Huntsville, AL (US)

(72) Inventor: Alexander Chiang Wei, Renton, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 149 days.

(21) Appl. No.: 17/879,644

(22) Filed: Aug. 2, 2022

(65) Prior Publication Data

US 2024/0045847 A1     Feb. 8, 2024

(51) Int. Cl.
| | |
|---|---|
| *G06F 16/22* | (2019.01) |
| *G06F 16/2455* | (2019.01) |
| *G06F 16/901* | (2019.01) |

(52) U.S. Cl.
CPC .... *G06F 16/2246* (2019.01); *G06F 16/24566* (2019.01); *G06F 16/9027* (2019.01)

(58) Field of Classification Search
CPC ........... G06F 16/2246; G06F 16/24566; G06F 16/9027
See application file for complete search history.

(56) References Cited

U.S. PATENT DOCUMENTS

| | | |
|---|---|---|
| 8,108,429 B2 | 1/2012 | Sim-Tang et al. |
| 8,412,741 B2 | 4/2013 | Hein |
| 9,092,500 B2 | 7/2015 | Varadharajan et al. |

| | | |
|---|---|---|
| 10,140,350 B2 | 11/2018 | Dobinson et al. |
| 10,430,432 B2 | 10/2019 | Bowman et al. |
| 2006/0129462 A1 | 6/2006 | Pankl |
| 2013/0097125 A1* | 4/2013 | Marvasti ................. G06F 16/90 707/E17.002 |
| 2018/0203897 A1* | 7/2018 | Van Rest ............ G06F 16/9024 |
| 2019/0213893 A1 | 7/2019 | Roy et al. |
| 2021/0125144 A1* | 4/2021 | Liu ........................ G06Q 30/04 |

FOREIGN PATENT DOCUMENTS

| | | |
|---|---|---|
| CN | 107038346 A | 8/2017 |
| CN | 109240835 A | 1/2019 |
| CN | 106802905 B | 4/2020 |
| CN | 111709702 A | 9/2020 |
| CN | 113487284 A | 11/2022 |

OTHER PUBLICATIONS

Xiafei Qiu, Wubin Cen, Zhengping Qian, You Peng, Ying Zhang, Xuemin Lin, and Jingren Zhou. 2018. Real-time constrained cycle detection in large dynamic graphs. Proc. VLDB Endow. 11, 12 (Aug. 2018), 1876â1888. https://doi.org/10.14778/3229863. 3229874 (Year: 2018).*

* cited by examiner

*Primary Examiner* — Amanda L Willis

(74) *Attorney, Agent, or Firm* — Knobbe, Martens, Olson & Bear, LLP

(57) ABSTRACT

Systems, methods, and non-transitory storage media are provided for replication of data and/or retrieval of (replicated) data using recursive tree structure searching. For instance, a system may use one or more self join operations to expand a tree graph in fewer iterations that are taken with typical tree graph expansion methods. Once the tree graph is expanded, the system can respond to a query by providing a list of child paths of a node referenced in the query or a list of parent nodes of a node referenced in the query.

9 Claims, 11 Drawing Sheets

700

| ROOT | ITER. 1 | ITER. 2 | ITER. 3 | ITER. 4 |
|---|---|---|---|---|
| A | AB | ABD | | |
| | | ABD | | |
| | | ABF | | |
| | AC | ACG | ACGHI | ACGHIJKBD |
| | | | | ACGHIJKBD |
| | | | | ACGHIJKBF |
| | | | | ACGHIJLNO |
| | | | | ACGHIJLNO |
| | | ACB | | |
| | AQ | AQI | AQIJK | AQIJKMRST |
| | | AQIJL | | |
| B | BD | | | |

| ROOT | ITER. 1 | ITER. 2 | ITER. 3 | ITER. 4 |
|---|---|---|---|---|
| | | BD | | |
| | | BF | | |
| C | CG | CGH | CGHIJ | CGHIJKMRS |
| | | | | CGHIJKNOP |
| | | | | CGHIJKNOP |
| | CB | CBD | | |
| | | CBD | | |
| | | CBF | | |
| D | | | | |
| F | | | | |
| G | GH | GHI | GHIJK | GHIJKMRST |
| | | | GHIJL | |

MANAGER SYSTEM 105

MEMORY 280

OPERATING SYSTEM 282

REPLICATION ENGINE 284

UPDATE ENGINE 286

TREE ENGINE 288

PROCESSING UNIT 290

NETWORK INTERFACE 292

COMPUTER READABLE MEDIUM DRIVE 294

INPUT/OUTPUT DEVICE INTERFACE 296

400

Figure 6:
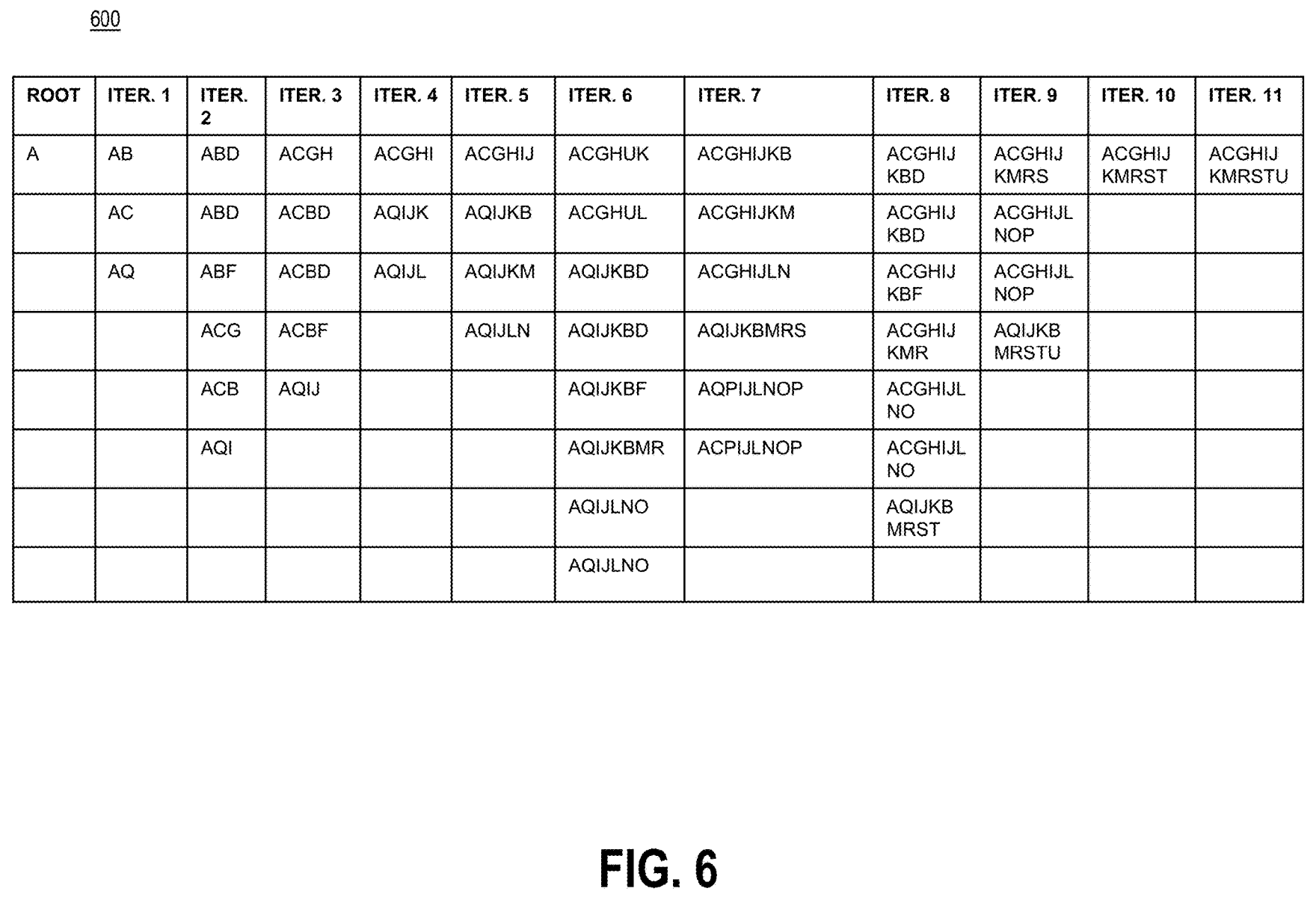

600

| ROOT | ITER. 1 | ITER. 2 | ITER. 3 | ITER. 4 | ITER. 5 | ITER. 6 | ITER. 7 | ITER. 8 | ITER. 9 | ITER. 10 | ITER. 11 |
|---|---|---|---|---|---|---|---|---|---|---|---|
| A | AB | ABD | ACGH | ACGHI | ACGHIJ | ACGHIJK | ACGHIJKB | ACGHIJKBD | ACGHIJKMRS | ACGHIJKMRST | ACGHIJKMRSTU |
| | AC | ABD | ACBD | AQIJK | AQIJKB | ACGHIJL | ACGHIJKM | ACGHIJKBD | ACGHIJLNOP | | |
| | AQ | ABF | ACBD | AQIJL | AQIJKM | AQIJKBD | ACGHIJLN | ACGHIJKBF | ACGHIJLNOP | | |
| | | ACG | ACBF | | AQIJLN | AQIJKBD | AQIJKBMRS | ACGHIJKMR | AQIJKBMRSTU | | |
| | | ACB | AQIJ | | | AQIJKBF | AQPIJLNOP | ACGHIJLNO | | | |
| | | AQI | | | | AQIJKBMR | ACPIJLNOP | ACGHIJLNO | | | |
| | | | | | | AQIJLNO | | AQIJKBMRST | | | |
| | | | | | | AQIJLNO | | | | | |

| ROOT | ITER. 1 | ITER. 2 | ITER. 3 | ITER. 4 |
|---|---|---|---|---|
| A | AB | ABD | | |
| | | ABD | | |
| | AC | ABF | | ACGHIJKBD |
| | | ACG | ACGHI | ACGHIJKBD |
| | | | | ACGHIJKBF |
| | | | | ACGHIJLNO |
| | | ACB | | ACGHIJLNO |
| | AQ | AQI | AQIJK | AQIJKMRST |
| | | | AQIJL | |
| B | BD | | | |

| ROOT | ITER. 1 | ITER. 2 | ITER. 3 | ITER. 4 |
|---|---|---|---|---|
| | BD | | | |
| | BF | | | |
| C | CG | CGH | CGHIJ | CGHIJKMRS |
| | | | | CGHIJKNOP |
| | | | | CGHIJKNOP |
| | CB | CBD | | |
| | | CBD | | |
| D | | CBF | | |
| F | | | | |
| G | GH | GHI | GHIJK | GHIJKMRST |
| | | | GHIJL | |

| ROOT | ITER. 1 | ITER. 2 | ITER. 3 | ITER. 4 |
|---|---|---|---|---|
| H | HI | HIJ | HIJKB | |
| | | | HIJKM | |
| | | | HIJLN | |
| I | IJ | IJK | IJKBD | |
| | | | IJKBD | |
| | | | IJKBF | |
| | | IJL | IJLNO | |
| | | | IJLNO | |
| J | JK | JKB | JKMRS | |
| | JL | JKM | JLNOP | |
| | | JLN | JLNOP | |

| ROOT | ITER. 1 | ITER. 2 | ITER. 3 | ITER. 4 |
|---|---|---|---|---|
| K | KB | KBD | | |
| | | KBD | | |
| | | KBF | | |
| | KM | KMR | KMRST | |
| L | LN | LNO | | |
| | | LNO | | |
| M | MR | MRS | | |
| N | NO | NOP | | |
| | NO | NOP | | |
| O | OP | | | |
| R | RS | RST | | |
| S | STU | | | |

| ROOT | ITER. 1 | ITER. 2 | ITER. 3 | ITER. 4 |
|------|---------|---------|---------|---------|
| T | TU | | | |
| U | | | HIJKM | |
| Q | QI | QIJ | QIJKB | |
| | | | QIJKM | |
| | | | QIJLN | |

FIG. 7C

DATA REPLICATION AND RECURSIVE TREE STRUCTURE SEARCHING

BACKGROUND

Field

The technology relates to graph databases, and, in particular, to replication of data and retrieval of (replicated) data using recursive tree structure searching.

Description of the Related Art

Graph databases may be efficient at returning discrete values and data associated with individual nodes. However, graph databases, such as for product lifecycle management (PLM) systems, may be inefficient at executing exhaustive searches. For instance, while executing an exhaustive search, a computing system may overrun a cache (e.g., memory) and utilize storage to execute the exhaustive search. In this case, a process time may increase (e.g., exponentially) as storing data to storage and retrieving data from storage to execute the exhaustive search may introduce delays and/or errors.

Moreover, in some cases, product lifecycle management systems may not be hosted in a scalable environment. Thus, downstream processes (e.g., big data or analytics) that consume data from such systems may be bottlenecked in data consumption.

SUMMARY

Various embodiments of systems, methods, and devices within the scope of the appended claims each have several aspects, no single one of which is solely responsible for the desirable attributes described herein. Without limiting the scope of the appended claims, some prominent features are described herein.

Disclosed herein are systems, methods, and non-transitory storage media for replication of data and retrieval of (replicated) data using recursive tree structure searching.

One aspect of the disclosure provides a computer-implemented method comprising: generating an edge list based on a traversal of a tree graph; generating an expanded tree of the tree graph using the edge list in one or more iterations based, at least in part, on performing one or more self join operations during each iteration of the one or more iterations; receiving, from a client device, a query that identifies a target node in the tree graph; searching the expanded tree for the target node; generating a list of one of child paths of the target node or parent nodes of the target node based on the searching; and transmitting the list to the client device.

The computer-implemented method of the preceding paragraph can include any sub-combination of the following features: where the computer-implemented method further comprises: requesting product lifecycle management (PLM) data from a PLM system, and generating the tree graph based on the PLM data; where generating the tree graph based on the PLM data further comprises storing at least a portion of the PLM data in one or more nodes of the tree graph; where the query comprises a request for one or more component parts of a system; where the query comprises a request for a reverse bill of material search of the PLM data; where generating an expanded tree of the tree graph further comprises: identifying, in a first iteration, one or more first paths between each parent node in the tree graph and each child node of the respective parent node using the edge list, and joining, in a second iteration, each pair of first paths in which a first one of the first paths in the respective pair ends at a same node that starts a second one of the first paths in the respective pair to form one or more second paths; where joining each pair of first paths further comprises: generating a new edge that includes a head of the first one of the first paths as a head of the new edge and a tail of the second one of the second paths as a tail of the new edge, and appending the new edge to a working list based on the edge list; and where the computer-implemented method further comprises pruning loop paths from the expanded tree.

Another aspect of the disclosure provides a system comprising at least one processor. The system further comprises at least one non-transitory storage media storing instructions that, when executed by the at least one processor, cause the at least one processor to: generate an edge list based on a traversal of a tree graph; generate an expanded tree of the tree graph using the edge list in one or more iterations based, at least in part, on performing one or more self join operations during each iteration of the one or more iterations; receive, from a client device, a query that identifies a target node in the tree graph; search the expanded tree for the target node; generate a list of one of child paths of the target node or parent nodes of the target node based on the searching; and transmit the list to the client device.

The system of the preceding paragraph can include any sub-combination of the following features: where the instructions, when executed, further cause the at least one processor to: request product lifecycle management (PLM) data from a PLM system, and generate the tree graph based on the PLM data; where the instructions, when executed, further cause the at least one processor to store at least a portion of the PLM data in one or more nodes of the tree graph; where the query comprises a request for one or more component parts of a system; where the query comprises a request for a reverse bill of material search of the PLM data; where the instructions, when executed, further cause the at least one processor to: identify, in a first iteration, one or more first paths between each parent node in the tree graph and each child node of the respective parent node using the edge list, and join, in a second iteration, each pair of first paths in which a first one of the first paths in the respective pair ends at a same node that starts a second one of the first paths in the respective pair to form one or more second paths; where the instructions, when executed, further cause the at least one processor to: generate a new edge that includes a head of the first one of the first paths as a head of the new edge and a tail of the second one of the second paths as a tail of the new edge, and append the new edge to a working list based on the edge list; where the instructions, when executed, further cause the at least one processor to join, in a third iteration, each pair of second paths in which a first one of the second paths in the respective pair ends at a same node that starts a second one of the second paths in the respective pair to form one or more third paths; and where the instructions, when executed, further cause the at least one processor to repeat a join operation until a distance associated with a current iteration is greater than a distance of any path in a working list that is based on the edge list.

Another aspect of the disclosure provides at least one non-transitory storage media storing instructions that, when executed by at least one processor, cause the at least one processor to perform operations, the operations comprising: generating an edge list based on a traversal of a tree graph; generating an expanded tree of the tree graph using the edge list in one or more iterations based, at least in part, on performing one or more self join operations during each iteration of the one or more iterations; receiving, from a client device, a query that identifies a target node in the tree graph; searching the expanded tree for the target node; generating a list of one of child paths of the target node or parent nodes of the target node based on the searching; and transmitting the list to the client device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 6 depicts a table that shows the different paths that the system may identify in different iterations using a typical tree graph expansion;

FIGS. 7A-7C depict a table that shows the different paths that the tree engine may identify in different iterations using the improved tree graph expansion;

DETAILED DESCRIPTION

Figure 1:
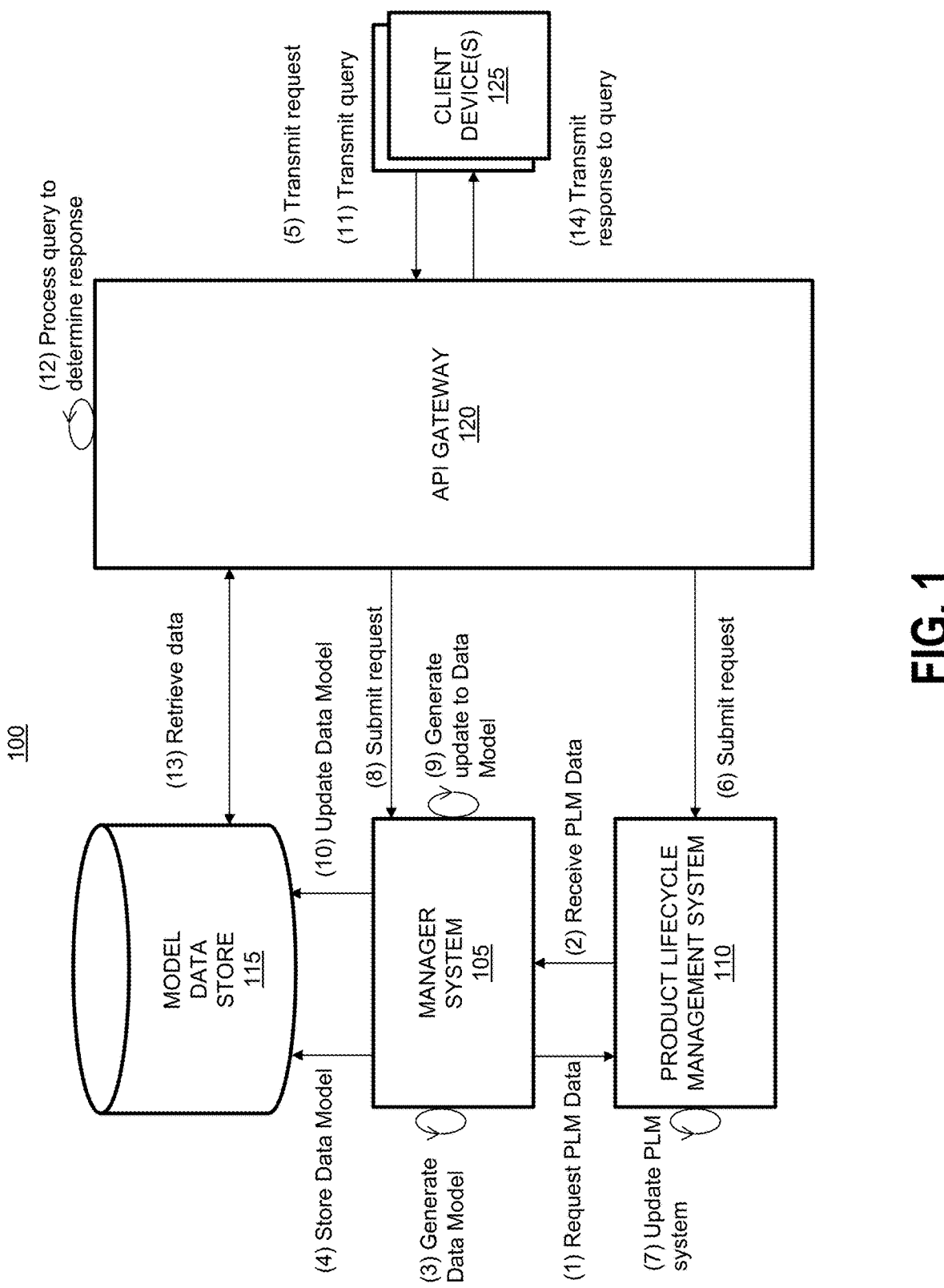
FIG. 1 is a block diagram depicting an illustrative environment in which a manager system can replicate data in a data model and an application programming interface (API) gateway can retrieve data from the data model in response to queries.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments"

in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the present disclosure.

In some cases, a manager system of the present disclosure may replicate PLM data of a PLM system in a separate scalable environment. In this case, the manager system may enable a scalable (e.g., in accordance with request or query load) API interface for downstream processes.

In some cases, an API gateway of the present disclosure may process queries using a data model (e.g., replicated PLM data, but generally data stored in a graph tree) and expanded trees of the data model. The expanded trees of the data model may be generated using a recursive tree method that avoids overrunning a memory of a device, thus processing queries in less time and with less computations. In some cases, the queries may be an exhaustive search to determine all paths below a parent node (e.g., component parts for PLM data) or determine all parent nodes of a node (e.g., reverse bill of material search for PLM data).

As will be appreciated by one of skill in the art in light of the present disclosure, the embodiments disclosed herein improve the ability of computing systems, such as graph database computing systems, to execute exhaustive searches. Moreover, the presently disclosed embodiments address technical problems inherent within computing systems; specifically, the difficulties in performing exhaustive searches of graph databases. For instance, by recursively joining sets of edges with themselves, the present disclosure may determine an expanded tree in logarithmic expansion instead of at linear expansion (e.g., advancing one edge distance each iteration). These technical problems are addressed by the various technical solutions described herein, including a computing system configured to determine expanded trees and execute exhaustive searches on expanded trees. Thus, the present disclosure represents an improvement on computing systems in general.

Environment Overview

FIG. 1 is a block diagram depicting an illustrative environment 100 in which a manager system 105 can replicate data in a data model and an API gateway 120 can retrieve data from the data model in response to queries. In particular, the environment 100 may include client device(s) 125, the API gateway 120, the manager system 105, a PLM system 110, and a model data store 115. The client device(s) 125, the API gateway 120, the manager system 105, the PLM system 110, and the model data store 115 are in communication with each other, via a network.

The manager system 105 and the API gateway 120 may be associated with an organization. For instance, the manager system 105 may and/or the API gateway 120 may be associated with a database system of an organization, to store data and provide data and/or metadata about data. In some cases, the manager system 105 and/or API gateway

120 may manage PLM data in conjunction with the PLM system 110. However, certain features of the disclosure are applicable to graph databases in general and are not limited to PLM data or PLM systems, such as PLM system 110.

The client device(s) 125 (hereinafter referred to as "client device 125" for ease of reference) can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. The manager system 105 and/or API gateway 120 may provide the client device 125 with one or more user interfaces, command-line interfaces (CLI), application programing interfaces (API), and/or other programmatic interfaces for updating (e.g., adding, changing, deleting, and the like) data in the model data store 115 and/or the PLM system 110 and querying data in the model data store 115 and/or the PLM system 110. Although one or more embodiments may be described herein as using a user interface, it should be appreciated that such embodiments may, additionally or alternatively, use any CLIs, APIs, or other programmatic interfaces.

In some embodiments, the client device 125 is a client device associated with a user (such as engineers or administrators of the organization) associated with a user account that is granted access to model data and/or PLM data via the API gateway 120. Users may interact with client device 125 to transmit requests and queries, and the client device 125 may display responses (e.g., update to data completed in response to a request) and/or data (e.g., in response to a query).

The manager system 105 and the API gateway 120 may be combined or separate. As shown in FIG. 1, the manager system 105 and the API gateway 120 are separate to clarify the operations of each, but one of skill in the art would recognize that the respective functions may be differently arranged. The manager system 105 and the API gateway 120 may be hosted in a computing device, a server system, a cloud-hosted computing system, or the like. The manager system 105 and the API gateway 120 may be hosted on the same or separate physical computing devices or same or separate virtual machines, etc. to process requests for options for medication fulfillment.

In some cases, the manager system 105 may replicate PLM data in a data model and store the data model in the model data store 115. In other cases, the manager system 105 stores other data, such as graph databases in the model data store 115.

In some cases, the API gateway 120 may manage requests and queries from client devices 125. In some cases, the API gateway 120 may relay requests to the manager system 105 and/or the PLM system 110 to update the data mode and/or the PLM data. In some cases, the API gateway 120 may process queries and return responses to client devices 125 based on data stored in the data model and/or an expanded tree of the data model.

In some cases, the model data store 115 may be a cloud scalable environment to host data (e.g., in graph databases and the like). In some cases, the model data store 115 may be a storage as a service system operated by, e.g., the operation or a third party. Generally, the model data store 115 may be responsive to requests for data from the API gateway 120 and responsive to requests to update data of the data model from the manager system 105.

In some cases, the PLM system 110 may be a system to host and manage PLM data. PLM data may indicate relationships between parts (e.g., hardware or software) of products and services, and store data for each part (e.g., specifications, interfaces, and the like). The PLM system 110 may be associated with a third party separate from the operation associated with the manager system 105 and the API gateway 120. The PLM system 110 may be accessed via requests formatted in accordance with an API of the PLM system 110.

The network may include any wired network, wireless network, or combination thereof. For example, the network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In accordance with embodiments of the present disclosure, the manager system 105 may replicate model data of the PLM system 110, and the API gateway 120 may retrieve data from the replicated model data. As an example, the manager system 105 and/or the API gateway 120 may replicate and retrieve data in accordance with a sequence of operations:

In operation (1), the manager system 105 may request PLM data from the PLM system 110. For instance, the manager system 105 may request PLM data from the PLM system 110 to bootstrap generation of a data model to replicate the PLM data in the data model. In some cases, the manager system 105 may request the PLM data in bulk (e.g., bulk segments), in parts (e.g., on a record-basis), and/or the like. In some cases, the manager system 105 may request the PLM data during certain periods of time (e.g., overnight) or during low workload periods (e.g., based on expected or historical request loads). In this manner, the manager system 105 may not interrupt operational actions of users while still obtaining a complete set of PLM data to generate a complete replication of PLM data in the data model.

In operation (2), the manager system 105 may receive the PLM data from the PLM system 110. For instance, the manager system 105 may receive the bulk segments or records of the PLM data as provided by the PLM system 110.

In operation (3), the manager system 105 may generate a data model. For instance, the manager system 105 may generate the data model based on the received PLM data. In some cases, the manager system 105 may store each part or bulk segment of PLM data until all PLM data is available to replicate the PLM data in the data model. In some cases, the manager system 105 may generate the data model as the bulk segments or parts are provided. To generate the data model, the manager system 105 may generate at least one tree graph based on the PLM data (e.g., a particular arrangement of nodes and edges) and migrate the PLM data to the at least one tree graph (e.g., storing discrete portions of the PLM data in nodes of the at least one tree graph).

In operation (4), the manager system 105 may store the data model in the model data store 115. For instance, the manager system 105 may store the data model in in the model data store 115 after the data model is generated or as parts of the data model are generated.

In operation (5), the client device 125 may transmit a request to the API gateway 120. For instance, the client device 125 may transmit the request to the API gateway 120 in response a user input on the client device 125. In some cases, the request may indicate an update to the data model and/or the PLM data, such as a request to add, delete, or modify relationships of nodes (e.g., edges between nodes); add, delete, or modify a node; and/or add, delete, or modify data of a node. The API gateway 120 may determine whether the request is properly formatted (e.g., in accordance with an API of the API gateway 120) and determine whether a user or client device 125 is authorized to perform a requested action (e.g., in accordance with an identity access management policy). In some cases, the authorization may be determined based on a portion of the data model or PLM data (e.g., differentiated access to portions of the data), or based on a role of a user, and the like. If the request is properly formatted and the user/client device 125 is authorized, the API gateway 120 may proceed, as discussed herein; otherwise, the API gateway 120 may not proceed and inform the client device 125 the request was denied (e.g., that the request was not authorized or not properly formatted).

In operation (6), the API gateway 120 may submit the request to the PLM system 110. For instance, the API gateway 120 may submit (e.g., transmit) the request to the PLM system 110 in accordance with an API of the PLM system 110. In some cases, the API gateway 120 may reformat the request in accordance with the API of the PLM system 110.

In operation (7), the PLM system 110 may update the PLM data based on the request. For instance, the PLM system 110 may update the PLM data to add, delete or modify nodes, relationships, or data as indicated by the request.

In operation (8), the API gateway 120 may submit the request to the manager system 105. For instance, the API gateway 120 may submit the request to the manager system 105, so that the manager system 105 may know that the PLM data is being updated (e.g., changed in some manner). In some cases, the manager system 105 may store a sequence of such requests to track updates. In some cases, the manager system 105 may start an update process to the data model based on (e.g., in response to) receiving the request.

In operation (9), the manager system 105 may optionally generate an update to the data model. For instance, the manager system 105 may generate an update to the data model by retrieving relevant data from the PLM system 110 or (independently) generating the update to the PLM data based on the request. In this manner, the manager system 105 may ensure that the data model is consistent with the PLM data of the PLM system 110. In the case the manager system 105 independently generates the update, the manager system 105 may compare its update with the PLM data of the PLM system 110.

In operation (10), the manager system 105 may optionally update the data model. For instance, the manager system 105 may update the data model by transmitting an update to the model data store 115. In some cases, the manager system 105 may update the data model by transmitting instructions to the model data store 115. In some cases, the instructions may indicate nodes, relationships, and/or the like to add, delete, or modify. In some cases, the instructions may add, delete, or modify data of nodes of the tree graph.

In operation (11), the client device 125 may transmit a query to the API gateway 120. For instance, the client device 125 may transmit the query to the API gateway 120 to execute an exhaustive search of a tree graph (of, e.g., one or more, such as a plurality of, tree graphs of the data model). In some cases, the exhaustive search may request all paths below a node or all parent nodes of a node. For instance, in the case that the data model is replicating PLM data, all paths below a node may indicate all component parts (e.g., software or hardware aspects) of a system, while all parent nodes of the node may indicate all systems in which a particular component part is a part of those systems.

In operation (12), the API gateway 120 may process the query to determine a response. For instance, the API gateway 120 may determine the response by executing a search of an expanded tree. In some cases, the API gateway 120 may determine whether the query is for an exhaustive search and, if so, search the expanded tree for relevant data (e.g., all parents, all paths, as the case may be); otherwise, the API gateway 120 may perform a different query method, such as data retrieval processes and the like. As discussed herein, the expanded tree may be an efficient method to determine all child paths of a node or all parents of a node. In some cases, the API gateway 120 may determine a set of nodes and/or edges based on the query. In some cases, the API gateway 120 may determine whether the query is a first type of query or a second type of query. The first type of query is a request for all paths (e.g., constituent parts of a system) and the second type of query is a request for all parent nodes (e.g., systems that include a part). Thus, the set of nodes and/or edges may return nodes and edges of the paths (e.g., a sequence of edges traversing nodes for all the paths for the first type of request) or parent nodes (e.g., a set of node identifications for the second type of request and, optionally, connecting paths thereto).

In operation (13), the API gateway 120 may retrieve data from the model data store 115. For instance, the API gateway 120 may retrieve the data from the model data store 115, so that the response may include additional information (e.g., such as names, identification numbers, data associated with respective nodes of the set of nodes and edges, and the like). In some cases, operation (13) may be omitted, and the set of nodes and/or edges may form the response. Thus, the API gateway 120 may generate a response based on at least the set of paths and/or nodes. In some cases, the API gateway 120 may generate the response based on the set of paths and/or nodes and the data retrieved from the model data store 115. Generally, the response may be formatted in accordance with the API of the API gateway 120.

In operation (14), the API gateway 120 may transmit the response to the client device 125. For instance, the API gateway 120 may transmit the response in the form of a webpage or application user interface (e.g., for a mobile or desktop application), so that the client device 125 may display data of the response on a display of the client device 125, or the API gateway 120 may transmit the response to provide a data file (e.g., with the set of nodes and/or edges, and (optionally) the retrieved data).

While the operations are numbered consecutively, this is for illustrative purposes only and is not meant to indicate an order of operations. For instance, the client device 125 may transmit a request to the API gateway 120 some time after the client device 125 transmits a query to the API gateway 120.

Computing System

Figure 2:
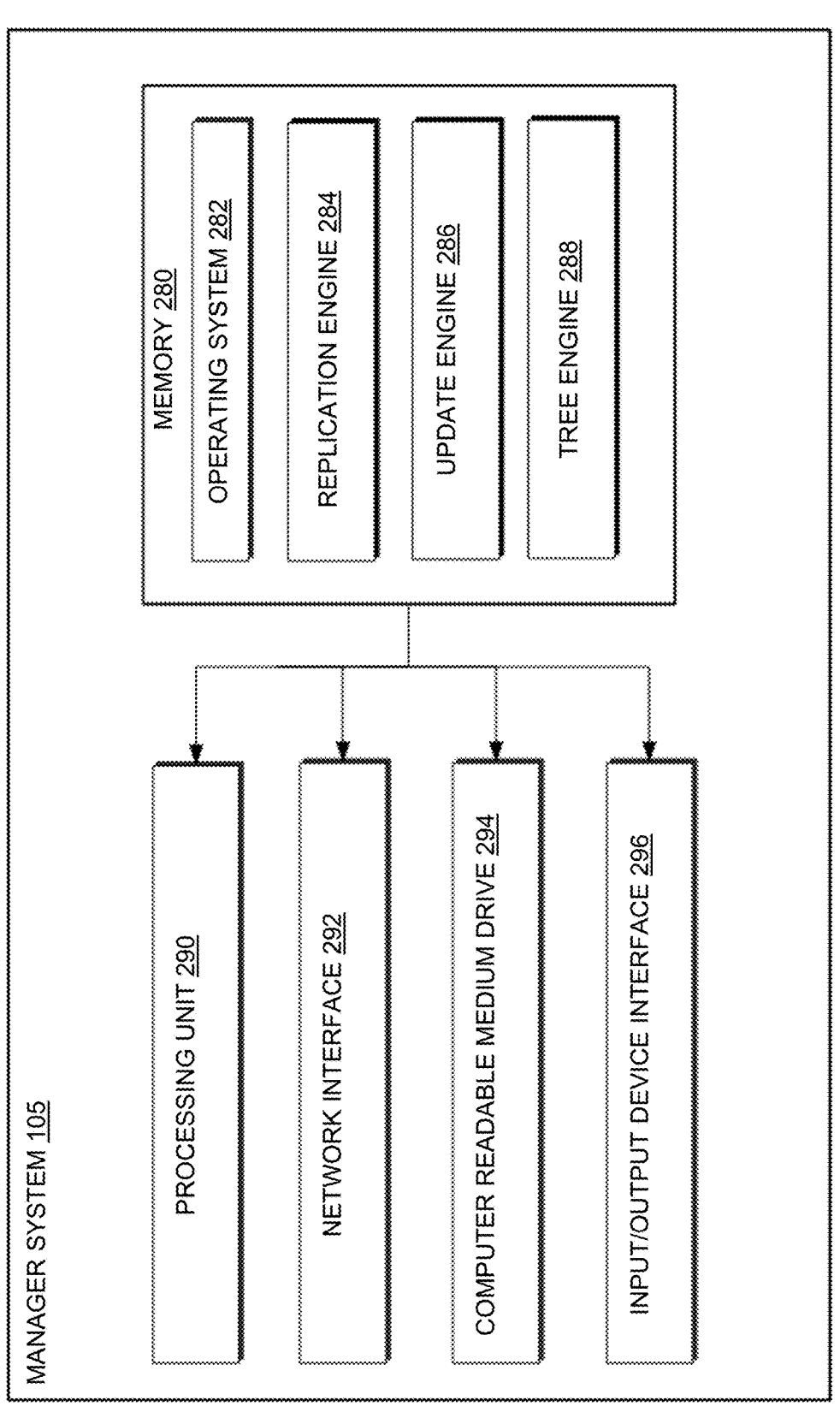
FIG. 2 depicts a general architecture of a computing device configured to implement the manager system of FIG. 1.

FIG. 2 depicts a general architecture of a computing system implementing the manager system 105 of FIG. 1. The general architecture of the system depicted in FIG. 2 includes an arrangement of computer hardware and software that may be used to implement aspects of the present disclosure. The hardware may be implemented on physical electronic devices, as discussed in greater detail below. The system may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 2 (e.g., the API gateway 120, etc.).

As illustrated, the system includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 280 may store an operating system 282 that provides computer program instructions for use by the processing unit 290 in the general administration and operation of the manager system 105. The memory 280 may further include computer program instructions and other information for implementing aspects of the present disclosure. For example, in one embodiment, the memory 280 includes a replication engine 284, an update engine 286, and a tree engine 288.

The replication engine 284 may represent code executable to request PLM data, generate at least one tree graph based on the PLM data, and migrate the PLM data to the at least one tree graph.

The update engine 286 may represent code executable to generate updates to the data model based on requests. To generate the updates, the update engine 286 may (e.g., on a first-in-first-out basis) receive requests, generate updates or retrieve updates from the PLM system 110, and cause the data model to the be updated in accordance therewith.

The tree engine 288 may represent code executable to generate an edge list and generate an expanded tree. To generate the edge list for a tree graph, the tree engine 288 may traverse the tree graph, scan for next nodes, and write down nodes seen and log an edge seen. If the node was seen before, the tree engine 288 may ignore the seen node for traversal. Otherwise, the tree engine 288 may continue traversing. In some cases, the tree engine 288 does not keep track of path along the way. Instead, the tree engine 288 may keep track of discrete edges encountered. The tree engine 288 may also avoid traversing a same sub-path twice. In this manner, the tree engine 288 may avoid a large result set size problem and efficiently yield a set of edges for the tree graph. To generate the expanded tree, the tree engine 288 may join edges of an iteration with edges of an iteration, as discussed herein.

The system of FIG. 2 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 2 as the manager system 105, similar components may be utilized in some embodiments to implement other devices shown in the environment of FIG. 2.

Data Replication

Figure 3:
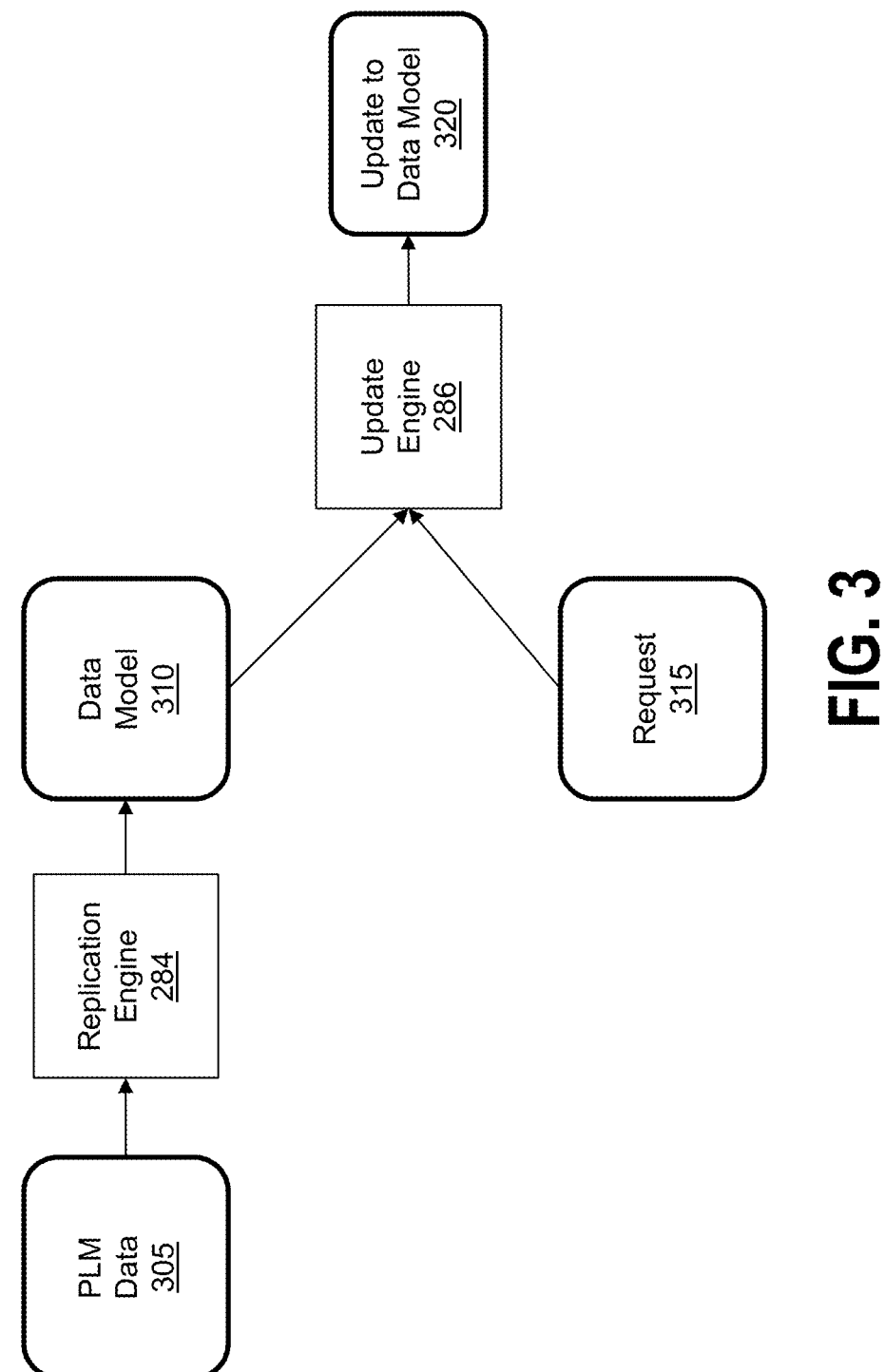
FIG. 3 is a block diagram depicting replication of data in a data model, as implemented by the manager system.

FIG. 3 is a block diagram 300 depicting replication of data in a data model, as implemented by the manager system 105. The diagram 300 may include the replication engine 284 and the update engine 286 to generate and update a data model 310.

The replication engine 284 may receive PLM data 305 (e.g., from the PLM system 110). The replication engine 284 may then generate the data model 310. For instance, as discussed herein, the replication engine 284 may generate the entire data model (if all PLM data has been received) or parts of the data model (if bulk segments or parts of PLM have been received). In some cases, the replication engine 284 may migrate the PLM data to a replicated version of the PLM data in the model data store 115. In this manner, the replication engine 284 may generate a copy of the PLM data in a scalable environment to service downstream requests (e.g., updates) or queries (e.g., to return information regarding relationships of nodes of the data model).

Subsequently (or as the data model 310 is being generated), the update engine 286 may receive request(s) 315 from, for example, client devices 125. The update engine 286 may process the request(s) 315 and generate update(s) to the data model 320. For instance, in some cases, the update engine 286 may determine a request relates to a portion of the data model already generated (e.g., by a node identifier) and process the request to update a respective portion of the data model. After the update or as a part of updating the respective portion of the data model, the update engine 286 may determine consistency against a separate update to the PLM data hosted by the PLM system 110. In this manner, the update engine 286 may ensure that the data model hosted in the model data store 115 is consistent with the PLM data of the PLM system 110 and downstream processes may not be delayed or interrupted.

Data Model

Figure 4:
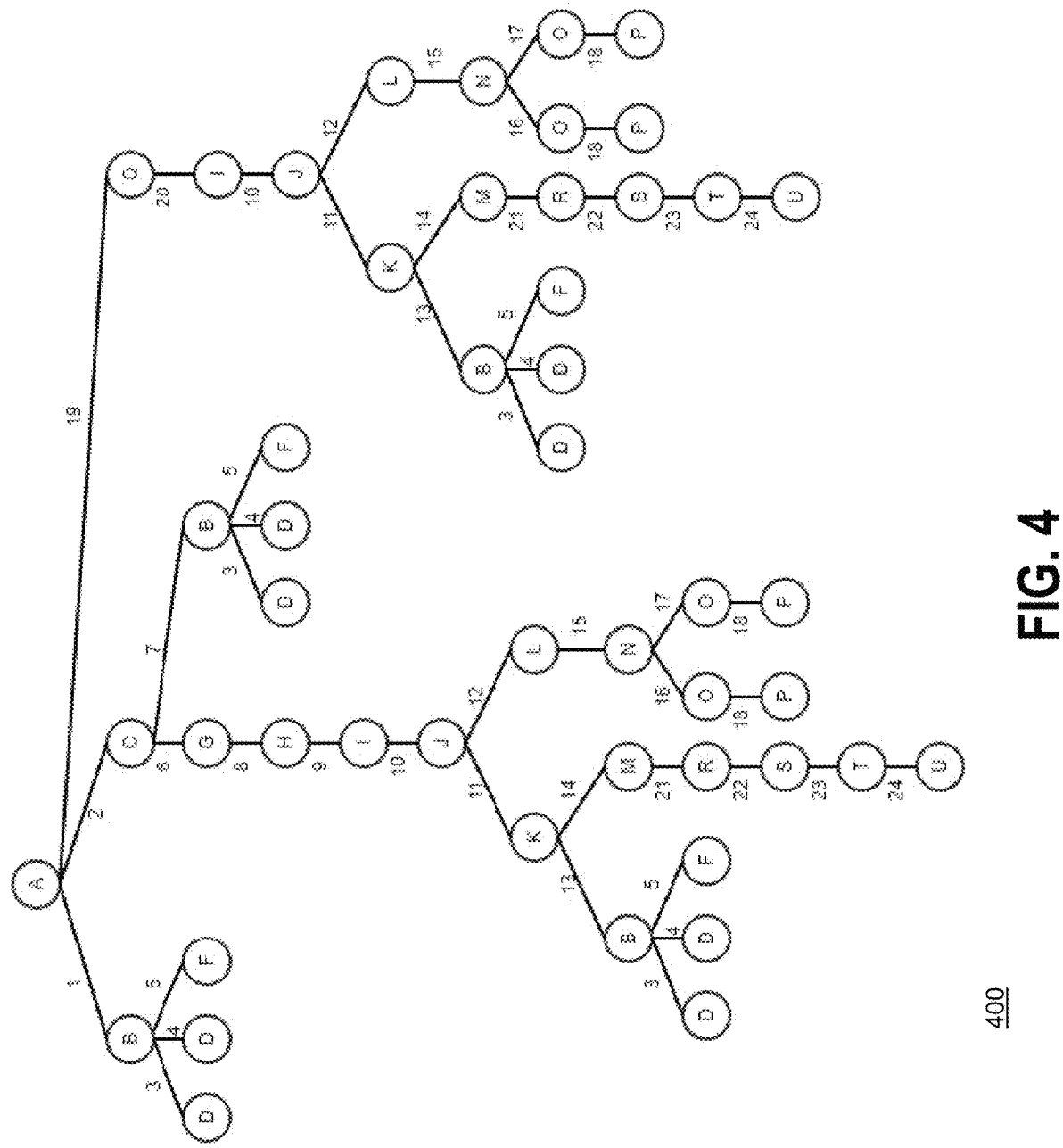
FIG. 4 is a diagram depicting a data model.

FIG. 4 is a diagram depicting a data model 400. The data model 400 includes nodes and edges. Each node may represent record, such as components of a system (or subsystems) in the case of PLM data. Each edge may represent a relationship between two nodes, that is between a parent node and a child node. In the case of PLM data, an edge may represent a hierarchy of relationship between components, that is that a first element (hardware or software) has second element (e.g., hardware or software) as a constituent element. Each node may be associated with a node identifier and associated with a record. Each record may store various data associated with the part or system (e.g., specifications, interfaces, and the like). Each parent node may have none, one, or more child nodes. Each edge may have an edge identifier and be associated with a root node and a tail node.

Data Retrieval

Figure 5:
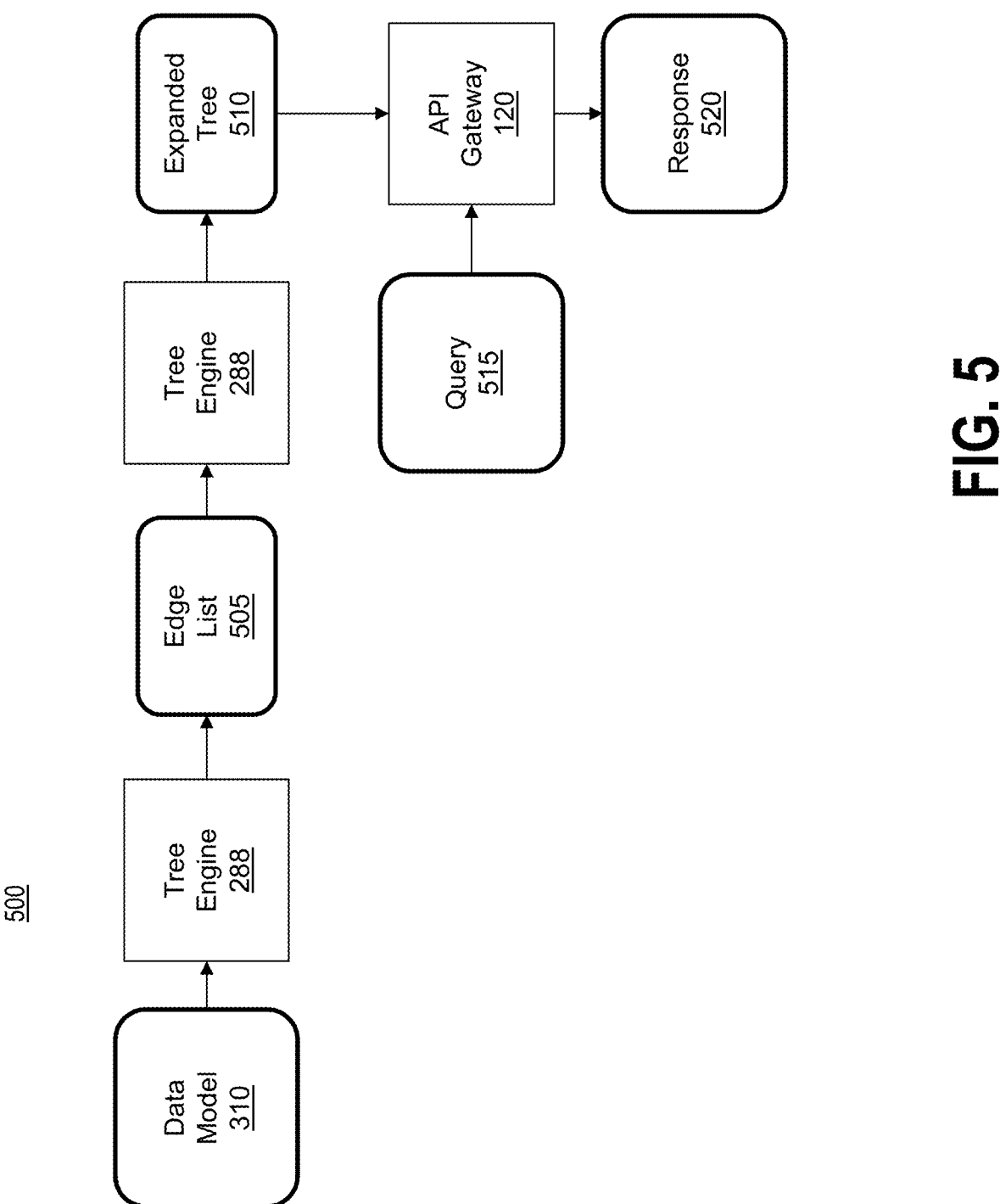
FIG. 5 is a block diagram depicting data retrieval from a data model, as implemented by the API gateway.

FIG. 5 is a block diagram 500 depicting data retrieval from a data model, as implemented by the API gateway 120. The diagram 500 may include the tree engine 288 generating an expanded tree 510 and the API gateway 120 using the expanded tree 510 to generate a response 520 in response to a query 515.

In some cases, the tree engine 288 may generate the expanded tree 510 in response to the query 515. In some cases, the tree engine 288 may generate the expanded tree 510 at periodic intervals (e.g., every set number of minutes, hours, or days). In some cases, the tree engine 288 may generate the expanded tree 510 in response to receiving requests (e.g., a threshold number of requests) to update the data model and/or the PLM data. For instance, if requests to update data are more frequent than queries, the manager system 105 may determine to generate the expanded tree 510 in response to queries (e.g., to use the most recent version of the data model). On the other hand, if requests to update data are less frequent than queries, the manager system 105 may determine to generate the expanded tree at set periods of time and index the expanded tree 510 for use in response to the queries. In some cases, the frequency difference may be an order of magnitude or more before either arrangement may be selected. In some cases, the manager system 105 may generate the expanded tree 510 (e.g., at set periods) and determine whether a tree graph has been updated by a request after the expanded tree 510 was generated (e.g., by comparing time stamps) before proceeding with processing a query on the expanded tree 510. In the case of a request updating the tree graph after the expanded tree 510 was generated, the manager system 105 may determine if only data of a node was updated, the manager system 105 may indicate that the expanded tree 510 is still usable; if the manager system 105 determines a relationship or node was added, deleted, or modified, the manager system 105 may determine the expanded tree 510 may be regenerated before proceeding with responding to the query.

To generate the expanded tree 510, the tree engine 288 may obtain the data model 310, generate an edge list 505 based on the data model 310, and generate the expanded tree 510 based on the edge list 505. For instance, the tree engine 288 may traverse a tree graph as discussed herein and determine the edge list 505. Table 1 may be an example edge list 505 (as based on data model 400 of FIG. 4).

TABLE 1

| Example Edge List 505: | | |
| --- | --- | --- |
| edge_id | root | tail |
| 1 | A | B |
| 2 | A | C |
| 3 | B | D |
| 4 | B | D |
| 5 | B | F |
| 6 | C | G |
| 7 | C | B |
| 8 | G | H |

TABLE 1-continued

| Example Edge List 505: | | |
| --- | --- | --- |
| edge_id | root | tail |
| 9 | H | I |
| 10 | I | J |
| 11 | J | K |
| 12 | J | L |
| 13 | K | B |
| 14 | K | M |
| 15 | L | N |
| 16 | N | O |
| 17 | N | O |
| 18 | O | P |
| 19 | A | Q |
| 20 | Q | I |
| 21 | M | R |
| 22 | R | S |
| 23 | S | T |
| 24 | T | U |

Typically, a tree graph, such as one based on the data model 400 of FIG. 4, is expanded iteratively by finding the next child in every path of the tree graph. For example, in a first iteration in a typical tree graph expansion using the data model 400, a system (e.g., a database) may identify paths AB, AC, and AQ that each represent a path from the root node (e.g., A) to one of the root node's children (e.g., B, C, and Q). In a second iteration in a typical tree graph expansion using the data model 400, the system may identify each child for each of the paths identified in the first iteration. Thus, the system may identify paths ABD, ABD, ABF, ACG, ACB, and AQI. The system can then repeat this pattern, identifying in each iteration each child for each of the paths identified in the previous iteration until all paths are identified.

FIG. 6 depicts a table 600 that shows the different paths that the system may identify in different iterations using a typical tree graph expansion. As illustrated in FIG. 6, it may take a system eleven iterations to identify all of the different paths in the data model 400. While a typical tree graph expansion may be useful for specific queries in which certain nodes and/or paths of a tree graph can be eliminated, the typical tree graph expansion may produce poor performance (e.g., increased query latency) if the system is considering all possible paths through the tree graph, which may be the case in use cases such as the ones described herein. In fact, the query performance of identifying all paths in a tree graph using typical tree graph expansion may further degrade as the size of the tree graph increases because system cache may be limited and therefore the system may not be able to store all of the data identifying all paths within the system cache. As a result, the system may have to use persistent storage (e.g., hard disks, solid state drives, etc.) that have longer read and/or write times than non-persistent storage (e.g., random access memory (RAM), etc.) to store the path data. In other words, typical tree graph expansion does not scale well in situations in which a tree graph corresponds to a large dataset.

The tree graph expansion described herein and implemented by the tree engine 288, however, may overcome the technical deficiencies of typical tree graph expansion and result in improved query performance (e.g., reduced query latency). In fact, using the data model 400 as an example, the tree graph expansion described herein may identify all paths in the tree graph in four iterations rather than eleven iterations, providing a more than double performance increase.

For example, the tree engine 288 may generate the expanded tree 510 based on the edge list 505. Optionally, the tree engine 288 initially identifies some or all of the nodes in the tree graph. For example, the tree engine 288 can scan the tree graph for nodes, storing an identification of a node that is identified that has not been identified before and an identification of a corresponding edge. If the tree engine 288 comes across a node that has already been identified as indicated in the stored data, then the tree engine 288 can ignore the node for graph traversal purposes. Otherwise, if the tree engine 288 comes across a node that has not already been identified as indicated in the stored data, then the tree engine 288 continues traversing that portion of the tree graph. At this stage, the tree engine 288 may not be keeping track of the paths in the tree graph. Rather, the tree engine 288 may simply be identifying nodes and/or edges in the tree graph.

Once the edge list 505 is obtained and/or the nodes in the tree graph are identified, the tree engine 288 may, in a first iteration, identify paths between each node and each child of the respective node in the tree graph using the edge list 505. After identifying paths between each node and each child of the respective node in the tree graph, the tree engine 288 may, in a second iteration, join the paths identified in the first iteration with themselves. Specifically, the tree engine 288 may join each pair of paths identified in the first iteration in which the first path in the pair ends at the same node that starts the second path in the pair. In other words, the tree engine 288 may determine the power of two distance of the current iteration level (e.g., the power of two distance of iteration level #1 is $2^0$ or 1, the power of two distance of iteration level #2 is $2^1$ or 2, the power of two distance of iteration level #3 is $2^2$ or 4, and so on), identify the node in a path that is at the level in the tree graph that matches the power of two distance of the current iteration level (e.g., if in iteration #1 and the power of two distance is 1, then node B in the path AB is the node in the tree graph that is at level 1), and use the identified node as the root node for the join operation. As an illustrative example, the tree engine 288 may identify paths AB and BD in the first iteration. Because the path AB ends at the same node that starts the path BD, the tree engine 288 may join paths AB and BD in the second iteration to form path ABD. By joining in this manner, the tree engine 288 may avoid identifying duplicate paths, thereby reducing processing time and query latency.

In the third iteration, the tree engine 288 may repeat the process executed in the second iteration. Specifically, the tree engine 288 may join the paths identified in the second iteration with themselves, such as by joining each pair of paths identified in the second iteration in which the first path in the pair ends at the same node that starts the second path in the pair. As an illustrative example, the tree engine 288 may identify paths ACG and GHI in the second iteration. Because the path ACG ends at the same node that starts the path GHI, the tree engine 288 may join paths ACG and GHI in the third iteration to form path ACGHI.

The tree engine 288 can repeat these operations in any number of iterations until some or all paths in the tree graph are identified, thereby forming expanded tree 510. Here, the tree engine 288 may identify the remaining paths in the tree graph in the fourth iteration, and can cease the tree graph expansion after completing the fourth iteration. FIGS. 7A-7C depict a table 700 that shows the different paths that the tree engine 288 may identify in different iterations using the improved tree graph expansion. As illustrated in FIGS. 7A-7C, it may take the tree engine 288 four iterations (rather than eleven iterations as with the typical tree graph expansion) to identify all of the different paths in the data model 400.

Optionally, the tree engine 288 may remove or prune paths that are loops (e.g., a path that may be CBAFGBA, where the loop is BAFGB) by identifying any paths that have the same node as the root node and the tail node in any of the iterations, and removing or pruning such path from the list of paths.

The tree graph expansion described herein and implemented by the tree engine 288 is an improvement over typical tree graph expansion because typical tree graph expansion adds one new level in the tree graph to the set of identified paths each iteration, whereas the improved tree graph expansion implemented by the tree engine 288 adds $2^N$ levels in the tree graph to the set of identified paths each iteration (where N represents the iteration number or depth away from the root (e.g., iteration 3 in FIGS. 7A-7C corresponds to N having a value of 2).

A more detailed description of the operations implemented by the tree engine 288 to perform the tree graph expansion is described herein. For example, the tree engine 288 may load a list of edges (e.g., using the edge list 505) or a curated list of edges identified using a breadth first search algorithm or other similar search algorithm to form a working set. The working set formed by the tree engine 288 can be defined as including one or more edges, where each edge has a head, a tail, a distance between the head and tail, and a path. The tree engine 288 may select a parent node as the head and a child node as the tail (as found in the edge list), with the starting distance being set to 1 and the path being defined based on the name of the parent node and a delimiter (e.g., if the parent node is A, then "A>"). Alternatively or in addition, the tree engine 288 can define the path in the form of another data structure, such as an array.

The tree engine 288 then self joins the working set against itself. For example, the tree engine 288 can define, one or more times, a parent set and a child set, where a parent set is an edge in the working set that has a tail that is the same node as the head of an edge in the working set that represents a child set. The tree engine 288 can then create, for each pair of parent sets and child sets in which the tail of the parent set matches the head of the child set and are a distance apart that matches $2^N$ (where N represents the number of iterations), a new edge in which the head of the new edge is the head of the respective parent set, the tail of the new edge is the tail of the respective child set, the path of the new edge is a concatenation of the path of the respective parent set with the path of the respective child set, and the distance is set equal to 2. The tree engine 288 can then add the new edge(s) to the working set (e.g., generate a temporary table for the working set and appending new edge(s) to the temporary table). As an illustrative example, if the initial working set includes an edge with a head of A and a tail of B (having a path identified as "A>") and another edge with a head of B and a tail of C (having a path identified as "B>"), then the tree engine 288 may create a new edge that has a head of A, a tail of C, a distance of 2, and a path identified as "A>B>."

Optionally, the tree engine 288 can create new edges that are based on parent sets and child sets that have different distances. For example, the distance of a parent set may be equal to two to the power of the distance hit by the previous iteration (e.g., $2^1$ if the previous iteration is iteration #1), but the distance of a child set may have any value. In addition, to prevent duplicates, the tree engine 288 can specify that the distance of a parent set is equal to two to the power of the distance hit by the previous iteration (e.g., $2^3$ if the previous iteration is iteration #3), which prevents new edges identified in a current iteration from matching edges identified in previous iterations because the distance of the new edges will be at least 1 greater than the longest edge distances in previous iterations (e.g., the longest edge distance in a previous iteration may be at most equal to the distance of the parent set, the child set may have a minimum distance of 1, and therefore the new edge will have a longer distance once the parent set is joined with the child set).

The tree engine 288 can use these operations to identify potential path loops even if such loops do not begin at the start of a head or end at the end of a tail. For example, the tree engine can inspect new edges after an iteration is completed or after all iterations are complete, and identify and/or purge or remove any edges in which the path includes a string representing the name of a node that is both a head and a tail in that portion of the path. (e.g., if the path is "A>B>C>D>B>C," then the tree engine 288 may identify that "B" is both a head and a tail in the portion of the path that includes "B>C>D>B").

The tree engine 288 can then self join the working set against itself again, and repeat these operations one or more times to form the expanded tree 510. Each time a new self join is performed, the tree engine 288 can increase the distance value included in the new edges by a power of two. For example, the tree engine 288 can repeat these operations until the tree engine 288 can no longer find a parent set that has a distance that is at least $2^N$, where N represents the number of the last iteration. Once no more eligible parent sets can be found, the tree engine 288 can, for some or all of the edges in the working set, append the tail back onto the path. The operations described herein as being performed by the tree engine 288 to expand the tree graph may be referred to herein as recursive tree structure searching.

The API gateway 120 can receive a query 515 via a client device 125 before, during, and/or after the tree engine generates the expanded tree 510. If the query 515 is received after the tree engine 288 generates the expanded tree 510, then the API gateway 120 can forward the query 515 to the manager system 105 and the manager system 105 can use the expanded tree 510 to produce a response 520 (e.g., a list of some or all child nodes and/or paths of a queried node or a list of some or all parent nodes of a queried node) and send the response 520 to the API gateway 120 for transmission to the client device 125. If the tree engine 288 has not yet generated the expanded tree 510, then the API gateway 120 can forward the query 515 to the manager system 105, which causes the manager system 105 (e.g., tree engine 288) to generate the expanded tree 510 in a manner as described herein so that the response 520 can be produced and returned to the client device 125.

Example Flowchart(s)

Figure 8:
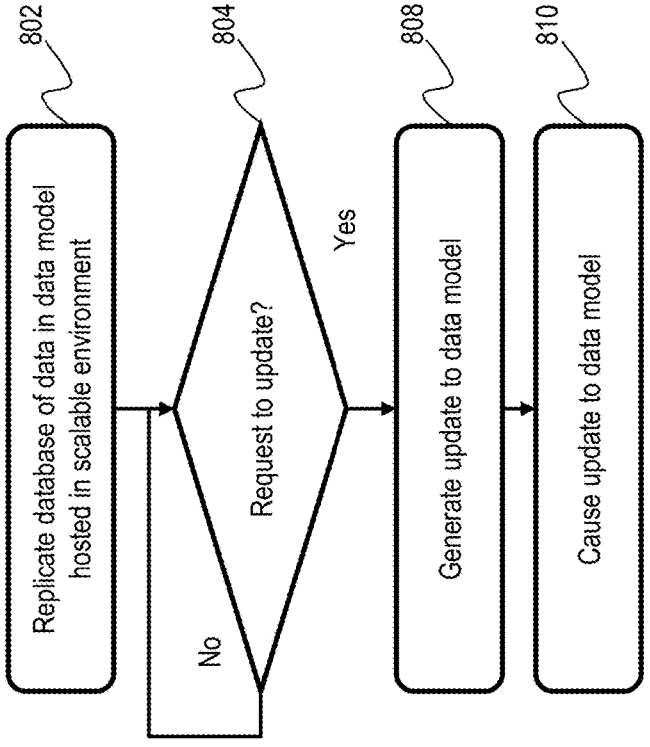
FIG. 8 is a flow chart depicting an illustrative routine implemented by the manager system for replicating and updating a data model.

With reference to FIG. 8, an illustrative routine 800 for replicating and updating model data, will be described. The routine 800 may be implemented, for example, by the manager system 105.

The routine 800 begins at block 802, where the manager system 105 may replicate database of data in data model hosted in scalable environment. For example, the manager system 105 may request PLM data and generate and store the data model in the model data store 115, as discussed herein.

At block 804, the manager system 105 may determine whether a request to update has been received. For example, the manager system 105 may determine whether a request to update the data model has been received from the API gateway 120, as discussed herein. In the case a request has not been received, the manager system 105 may return to block 804 and await a request to update the data model. In the case a request has been received, the manager system 105 may proceed to block 806.

At block 806, the manager system 105 may generate an update to the data model. For example, the manager system 105 may generate the update or retrieve the update from the PLM system 110, as discussed herein.

At block 808, the manager system 105 may cause an update to data model. For example, the manager system 105 may transmit instructions to the model data store 115, as discussed herein.

Figure 9:
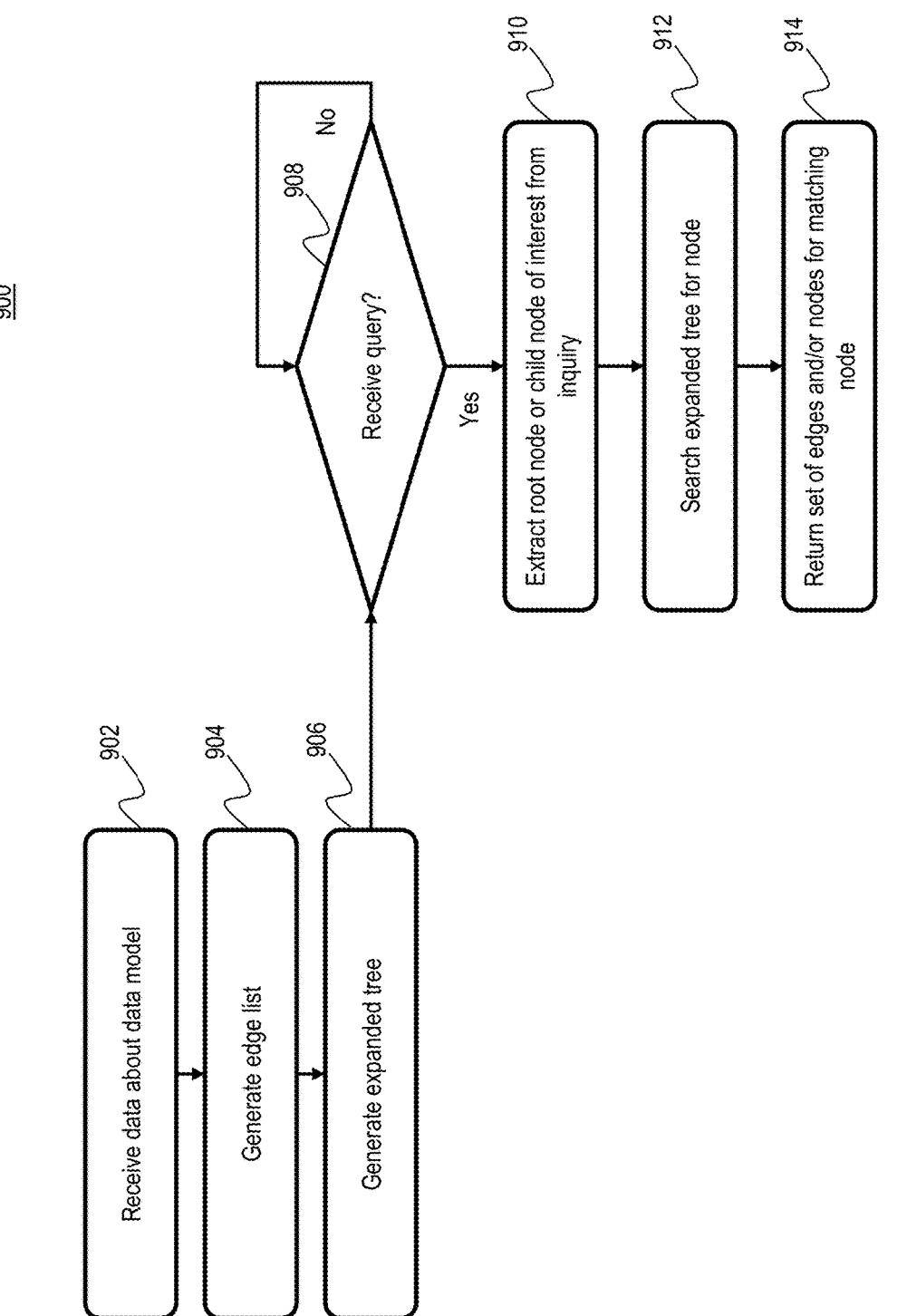
FIG. 9 is a flow chart depicting an illustrative routine implemented by the API gateway for retrieving data from a data model.

With reference to FIG. 9, an illustrative routine 900 for retrieving data from a data model, will be described. The routine 900 may be implemented, for example, by the manager system 105 and the API gateway 120.

The routine 900 begins at block 902, where the manager system 105 may receive data about a data model. For example, the manager system 105 may traverse a tree graph of the data model and obtain information about nodes and edges from the model data store 115, as discussed herein.

At block 904, the manager system 105 may determine an edge list. For example, the manager system 105 may determine discrete edges between different nodes based on the information about nodes and edges as the tree graph is traversed, and generate the edge list, as discussed herein.

At block 906, the manager system 105 may generate an expanded tree. For example, the manager system 105 may generate the expanded tree by self-joining sets of edges at each iteration to generate an expanded tree, as discussed herein.

At block 908, the API gateway 120 may determine whether a query has been received. For example, the API gateway 120 may determine whether a query has been received and the query is authorized and properly formatted, as discussed herein. In the case a query has not been received, the API gateway 120 may return to block 908 and await a query. In the case a query has been received, the API gateway 120 may proceed to block 910.

At block 910, the API gateway 120 may extract a root node or a child node of interest from the inquiry. For example, the API gateway 120 may parse the query and determine a type of query (e.g., a first or second type of query) and a target node from the query, as discussed herein, where the target node is a root node (to return all child paths) or the target node is a child node (to return all parent nodes).

At block 912, the API gateway 120 may search the expanded tree for the node. For example, the API gateway 120 may search the expanded tree for the target node and return (if a match is determined) child paths or parent nodes, as discussed herein.

At block 914, the API gateway 120 may return a set of edges and/or nodes for a matching node. For example, the API gateway 120 may generate the set of edges and/or nodes based on the child paths or parent nodes (in accordance with the query type), as discussed herein.

EXAMPLES

Various example embodiments of systems, methods, and non-transitory computer-readable medium relating to data replication and/or data retrieval can be found in the following clauses:

Clause 1. A computer-implemented method, comprising:
    generating an edge list based on a traversal of a tree graph;

generating an expanded tree of the tree graph using the edge list in one or more iterations based, at least in part, on performing one or more self join operations during each iteration of the one or more iterations;

receiving, from a client device, a query that identifies a target node in the tree graph;

searching the expanded tree for the target node;

generating a list of one of child paths of the target node or parent nodes of the target node based on the searching; and transmitting the list to the client device.

Clause 2. The computer-implemented method of Clause 1, further comprising:

requesting product lifecycle management (PLM) data from a PLM system; and generating the tree graph based on the PLM data.

Clause 3. The computer-implemented method of Clause 2, wherein generating the tree graph based on the PLM data further comprises storing at least a portion of the PLM data in one or more nodes of the tree graph.

Clause 4. The computer-implemented method of Clause 2, wherein the query comprises a request for one or more component parts of a system.

Clause 5. The computer-implemented method of Clause 2, wherein the query comprises a request for a reverse bill of material search of the PLM data.

Clause 6. The computer-implemented method of Clause 1, wherein generating an expanded tree of the tree graph further comprises:

identifying, in a first iteration, one or more first paths between each parent node in the tree graph and each child node of the respective parent node using the edge list; and joining, in a second iteration, each pair of first paths in which a first one of the first paths in the respective pair ends at a same node that starts a second one of the first paths in the respective pair to form one or more second paths.

Clause 7. The computer-implemented method of Clause 6, wherein joining each pair of first paths further comprises:

generating a new edge that includes a head of the first one of the first paths as a head of the new edge and a tail of the second one of the second paths as a tail of the new edge; and appending the new edge to a working list based on the edge list.

Clause 8. The computer-implemented method of Clause 6, further comprising joining, in a third iteration, each pair of second paths in which a first one of the second paths in the respective pair ends at a same node that starts a second one of the second paths in the respective pair to form one or more third paths.

Clause 9. The computer-implemented method of Clause 6, wherein further comprising repeating a join operation until a distance associated with a current iteration is greater than a distance of any path in a working list that is based on the edge list.

Clause 10. The computer-implemented method of Clause 1, further comprising pruning loop paths from the expanded tree.

Clause 11. A system, comprising:

at least one processor; and at least one non-transitory storage media storing instructions that, when executed by the at least one processor, cause the at least one processor to:

generate an edge list based on a traversal of a tree graph;

generate an expanded tree of the tree graph using the edge list in one or more iterations based, at least in part, on performing one or more self join operations during each iteration of the one or more iterations;

receive, from a client device, a query that identifies a target node in the tree graph;

search the expanded tree for the target node;

generate a list of one of child paths of the target node or parent nodes of the target node based on the searching; and transmit the list to the client device.

Clause 12. The system of Clause 11, wherein the instructions, when executed, further cause the at least one processor to:

request product lifecycle management (PLM) data from a PLM system; and generate the tree graph based on the PLM data.

Clause 13. The system of Clause 12, wherein the instructions, when executed, further cause the at least one processor to store at least a portion of the PLM data in one or more nodes of the tree graph.

Clause 14. The system of Clause 12, wherein the query comprises a request for one or more component parts of a system.

Clause 15. The system of Clause 12, wherein the query comprises a request for a reverse bill of material search of the PLM data.

Clause 16. The system of Clause 11, wherein the instructions, when executed, further cause the at least one processor to:

identify, in a first iteration, one or more first paths between each parent node in the tree graph and each child node of the respective parent node using the edge list; and join, in a second iteration, each pair of first paths in which a first one of the first paths in the respective pair ends at a same node that starts a second one of the first paths in the respective pair to form one or more second paths.

Clause 17. The system of Clause 16, wherein the instructions, when executed, further cause the at least one processor to:

generate a new edge that includes a head of the first one of the first paths as a head of the new edge and a tail of the second one of the second paths as a tail of the new edge; and append the new edge to a working list based on the edge list.

Clause 18. The system of Clause 16, wherein the instructions, when executed, further cause the at least one processor to join, in a third iteration, each pair of second paths in which a first one of the second paths in the respective pair ends at a same node that starts a second one of the second paths in the respective pair to form one or more third paths.

Clause 19. The system of Clause 16, wherein the instructions, when executed, further cause the at least one processor to repeat a join operation until a distance associated with a current iteration is greater than a distance of any path in a working list that is based on the edge list.

Clause 20. At least one non-transitory storage media storing instructions that, when executed by at least one processor, cause the at least one processor to perform operations, the operations comprising:

generating an edge list based on a traversal of a tree graph;

generating an expanded tree of the tree graph using the edge list in one or more iterations based, at least in part, on performing one or more self join operations during each iteration of the one or more iterations;

receiving, from a client device, a query that identifies a target node in the tree graph;

searching the expanded tree for the target node;

generating a list of one of child paths of the target node or parent nodes of the target node based on the searching; and transmitting the list to the client device.

Terminology

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of $\pm1\%$, $\pm5\%$, $\pm10\%$, or $\pm20\%$.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Further, the phrase "based on" is intended to mean "based at least partially on" unless explicitly stated otherwise.

What is claimed is:

1. A computer-implemented method, comprising:
transmitting, to a product lifecycle management (PLM) system, a request for PLM data;
generating a tree graph and migrating the PLM data to nodes of the tree graph;
storing the tree graph in a model data store;
identifying, in a first iteration, a plurality of first paths in a tree graph, wherein each first path in the plurality of first paths is a path between a parent node in the tree graph and a child node of the parent node;
joining, in a second iteration that is subsequent to the first iteration, each first path in the plurality of first paths identified in the first iteration with a second first path in the plurality of first paths identified in the first iteration that starts at a node in the tree graph at which the respective first path ends to form a plurality of joined paths, wherein each joined path in the plurality of joined paths has a length of three;
joining, in a third iteration that is subsequent to the second iteration, each joined path in the plurality of joined paths from the second iteration with another joined path in the plurality of joined paths from the second iteration that starts at a node in the tree graph at which the respective joined path ends to form a plurality of second joined paths, wherein each second joined path in the plurality of second joined paths has a length of five;
receiving, from a client device, a query that identifies a target node in the tree graph that corresponds to a component part of a system;
in response to receiving the query,
searching the plurality of second joined paths for child paths of the target node; and
generating a list of the child paths of the target node based on the searching;
retrieving, from the model data store, a portion of the PLM data associated with the child paths of the target node; and
transmitting the list and the portion of the PLM data associated with the child paths of the target node to the client device.

2. The computer-implemented method of claim 1, wherein the query comprises a request for a reverse bill of material search of the PLM data.

3. The computer-implemented method of claim 1, wherein joining each first pair in the plurality of first paths further comprises:
generating a new edge that includes a head of one of the first paths in the plurality of first paths as a head of the new edge and a tail of one of the second first paths in the plurality of first paths as a tail of the new edge; and
appending the new edge to a working list.

4. The computer-implemented method of claim 1, wherein further comprising repeating a join operation until a distance associated with a current iteration is greater than a distance of any path in a working list.

5. A system, comprising:

at least one processor; and at least one non-transitory storage media storing instructions that, when executed by the at least one processor, cause the at least one processor to:

transmit, to a product lifecycle management (PLM) system, a request for PLM data;

generate a tree graph and migrating the PLM data to nodes of the tree graph;

store the tree graph in a model data store identify, in a first iteration, a plurality of first paths in a tree graph, wherein each first path in the plurality of first paths is a path between a parent node in the tree graph and a child node of the parent node;

join, in a second iteration that is subsequent to the first iteration, each first path in the plurality of first paths identified in the first iteration with a second first path in the plurality of first paths identified in the first iteration that starts at a node in the tree graph at which the respective first path ends to form a plurality of joined paths, wherein each joined path in the plurality of joined paths has a length of three;

join, in a third iteration that is subsequent to the second iteration, each joined path in the plurality of joined paths from the second iteration with another joined path in the plurality of joined paths from the second iteration that starts at a node in the tree graph at which the respective joined path ends to form a plurality of second joined paths, wherein each second joined path in the plurality of second joined paths has a length of five;

receive, from a client device, a query that identifies a target node in the tree graph that corresponds to a component part of a system;

in response to reception of the query, search the plurality of second joined paths for child paths of the target node; and generate a list of the child paths of the target node based on the search;

retrieve, from the model data store, a portion of the PLM data associated with the child paths of the target node; and transmit the list and the portion of the PLM data associated with the child paths of the target node to the client device.

6. The system of claim 5, wherein the query comprises a request for a reverse bill of material search of the PLM data.

7. The system of claim 5, wherein the instructions, when executed, further cause the at least one processor to:

generate a new edge that includes a head of one of the first paths in the plurality of first paths as a head of the new edge and a tail of one of the second first paths in the plurality of first paths as a tail of the new edge; and append the new edge to a working list.

8. The system of claim 5, wherein the instructions, when executed, further cause the at least one processor to repeat a join operation until a distance associated with a current iteration is greater than a distance of any path in a working list.

9. At least one non-transitory storage media storing instructions that, when executed by at least one processor, cause the at least one processor to perform operations, the operations comprising:

transmitting, to a product lifecycle management (PLM) system, a request for PLM data;

generating a tree graph and migrating the PLM data to nodes of the tree graph;

storing the tree graph in a model data store;

identifying, in a first iteration, a plurality of first paths in a tree graph, wherein each first path in the plurality of first paths is a path between a parent node in the tree graph and a child node of the parent node;

joining, in a second iteration that is subsequent to the first iteration, each first path in the plurality of first paths identified in the first iteration with a second first path in the plurality of first paths identified in the first iteration that starts at a node in the tree graph at which the respective first path ends to form a plurality of joined paths, wherein each joined path in the plurality of joined paths has a length of three;

joining, in a third iteration that is subsequent to the second iteration, each joined path in the plurality of joined paths from the second iteration with another joined path in the plurality of joined paths from the second iteration that starts at a node in the tree graph at which the respective joined path ends to form a plurality of second joined paths, wherein each second joined path in the plurality of second joined paths has a length of five;

receiving, from a client device, a query that identifies a target node in the tree graph that corresponds to a component part of a system;

in response to reception of the query, searching the plurality of second joined paths for child paths of the target node; and generating a list of the child paths of the target node based on the search;

retrieving, from the model data store, a portion of the PLM data associated with the child paths of the target node; and transmiting the list and the portion of the PLM data associated with the child paths of the target node to the client device.

* * * * *